June 2, 1931.   G. WALKER   1,807,644
SCALE
Filed Nov. 14, 1927
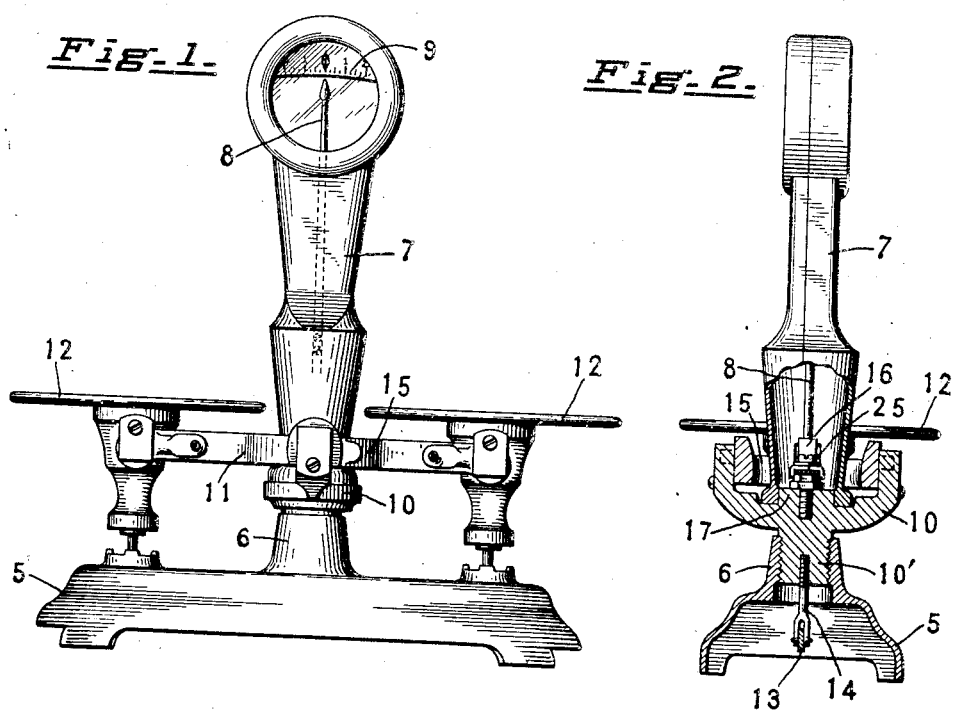
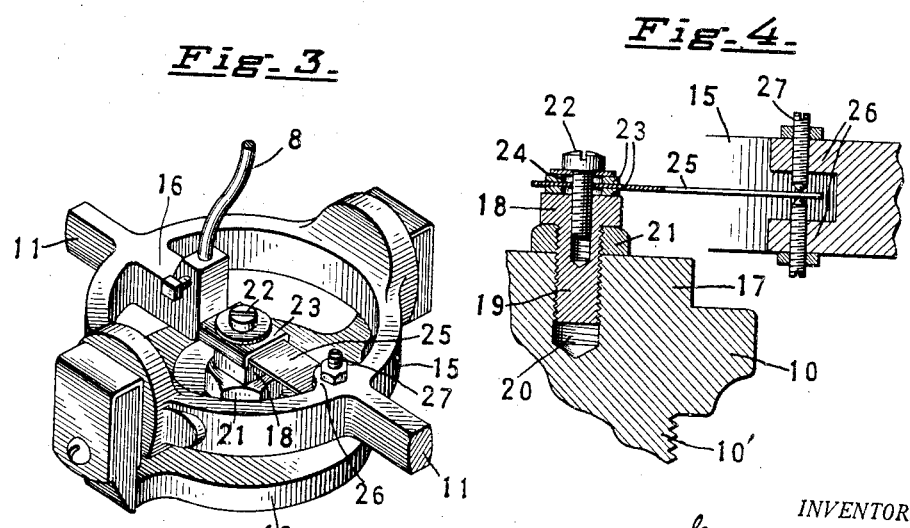
INVENTOR.
George Walker
BY
Dunn Dunn & Anderson
ATTORNEYS.

Patented June 2, 1931

1,807,644

UNITED STATES PATENT OFFICE

GEORGE WALKER, OF BROOKLYN, NEW YORK, ASSIGNOR TO THE JACOBS BROTHERS CO., INC., OF BROOKLYN, NEW YORK, A CORPORATION OF NEW YORK

SCALE

Application filed November 14, 1927. Serial No. 233,051.

This invention relates to an improved scale of the over and under weight type.

It is an object of the invention to provide an improved device of this character, which will always tend to assume a neutral or zero position, and which does not have to be disposed in an accurately predetermined horizontal plane in order that it may function with accuracy.

A further object of the invention is that of constructing a scale in which the parts may be readily adjusted, either to compensate for shocks or wear, or at the time the scale is set up at the factory.

A still further object is that of providing a scale, the parts of which will be relatively few in number, and individually simple and rugged in construction, aside from the fact that they may be assembled readily and adjusted to co-operate perfectly by relatively unskilled labor, so as to furnish a scale capable of being sold at a relatively low figure, and which will function efficiently over long periods of time, free from mechanical difficulties.

With these and other objects in mind, reference is had to the attached sheets of drawings, which show one practical embodiment of the invention, and in which:

Fig. 1 is a front elevation of such a scale;

Fig. 2 is an edge view, and partially a transverse section;

Fig. 3 is a perspective view of the collar portion of the beam; and

Fig. 4 is an enlarged sectional view, showing in detail the relationship of certain parts of the scale.

In these views the numeral 5 indicates the scale base, from which a standard 6 extends upwardly, this standard mounting a housing 7, within which a pointer 8 may oscillate, the latter preferably registering with a graduated dial or index 9 which may be viewed through an opening in the upper end of the housing 7. Mounted for rocking movement upon pivots supported by yoke arms 10 is the scale beam 11 which, as shown, may mount at its opposite ends pans 12, it being understood that the latter may be connected within the base by means of a check rod 13 centrally supported, as at 14, from a post 10' which forms a part of the yoke member and which is connected by screw threads with the standard 6 and extends within the same as shown in Figure 2. It will be obvious that any suitable form of dash-pot (not shown) may be connected with the beam in order to dampen the movements thereof and that, although according to the preferred embodiment of the invention the scale may generally include the parts specified, these parts may be modified in construction and arrangement in any desired manner.

The central portion of the beam 11 preferably takes the form of a collar 15, with which the pivots or knife edges of the beam are associated. As shown in Fig. 3, this collar preferably has an inwardly extending lug 16 which projects within the housing 7 through a slot formed in the body of the latter. The yoke 10 has an extension 17 in line with the post 10' and which is positioned within the base of the housing 7,—this extension mounting a supporting member 18, preferably by having the latter formed with a screw-threaded stem 19 extending into a correspondingly threaded bore 20, the stem being capable of being locked by means of a nut 21. The supporting member 18 is likewise formed with a screw-threaded bore which, in the embodiment illustrated, mounts the shank of a bolt 22, the head of which serves to clamp upon the supporting member a pair of plates 23, each formed with a slot 24 for passage of the bolt shank, the slot being, in each instance, of such length that the plates may be shifted. Interposed between these plates is one end of a spring strip 25, this strip preferably having an opening for the accommodation of the shank of the bolt 22, and the body of such strip extending horizontally towards the collar 15 at a point which, as shown, is diametrically opposite the base of the lug 16. At this point the collar is formed with a pair of spaced ears 26, each tapped and threaded to receive set-screws 27, the ends of which are preferably pointed in order that their frictional engagement with the strip 25 may be correspondingly reduced.

In operation it will be perceived that, with the parts set up in the manner aforesaid described, the beam will, at all times, tend to assume a position at which the pointer 8 registers with the zero graduation of the dial 9. This will be caused by the action of the spring strip 25, and the operation of the scale will not be affected detrimentally even if it is not positioned to rest in a true horizontal plane.

If now, an object is to be weighed, and a weight of a predetermined value is placed upon one of the pans and the object has been positioned upon the other, the pointer which is attached to the lug 16 (as shown in Fig. 3) will register the amount of over or under weight, or will indicate if a true balance is in effect. As the beam oscillates, a sliding contact is effected between the inner ends of the set-screws 27 and the surfaces of the strip 25, this serving as a connection between the beam and the strip.

Obviously, if adjustment of the parts is necessary, this may be achieved readily, in the first instance, by projecting and retracting the set-screws 27, in order that the beam may, in its position of rest, extend properly. In the second instance, adjustment may be achieved by moving the supporting member 18 with respect to the extension 17 upon which it is mounted. In the third instance, the effective tension of the strip may be varied by loosening the bolt 22, and projecting or retracting the plates 23 along the strip.

Thus, among others, the several objects of the invention are accomplished, but it is to be understood that numerous changes in structure and rearrangement of the parts may be resorted to, without in any case departing from the spirit of the invention.

Having described my invention, what I claim as new and desire to secure by Letters Patent is:

1. A scale of the even-balance type and including, in combination, a rockingly mounted beam, a base for supporting the same, a spring extending in a horizontal plane, means for connecting one end of said strip with said base means for connecting the opposite end thereof with said beam one of said connecting means including an element having sliding contact with the face of said strip.

2. A scale including a rockingly mounted beam, a base for supporting the same, a horizontally extending spring strip having connection with both said base and beam, said connection in one instance comprising a pair of spaced elements in sliding contact with said spring and between which the same is interposed, and in the second instance comprising a mounting member normally holding said spring against movement.

3. A scale including a rockingly mounted pan-supporting beam, a base for supporting the same, a pointer rigidly secured against movement with respect to said beam and a spring connected at one end to said beam and at its opposite end to said base one of the end connections of said spring including an element having sliding contact with its face.

4. A scale including a rockingly mounted beam, a base for supporting the same, a collar portion forming a part of the same, an arm extending inwardly from said portion, a pointer secured to said arm and held against movement with respect thereto and a spring having one of its ends connected to said beam and its opposite end being connected to said base.

5. A scale including a rockingly mounted beam, a base for supporting the same, a spring connected to said base and beam, one of the connections for said spring comprising a member adjustable transversely of the body of said spring.

6. A scale including a rockingly mounted beam, a base for supporting the same, a spring connected to said base and beam, one of the connections for said spring comprising a member adjustable transversely of the body of said spring, and tensioning means carried by said member and in engagement with said spring, said means being shiftable longitudinally of the spring.

7. A scale including a rockingly mounted beam, a base for supporting the same, a collar portion forming a part of said beam, a pair of spaced lips extending from said collar portion, a spring having one of its ends secured to said base, its opposite end extending between said lips and means associated with said lips and in slidable contact with said spring for connecting the latter with said beam.

8. A scale including a base, a standard extending from said base, a yoke, a beam rockingly mounted by said yoke, a post extending from said yoke and within said standard, and a check rod supported from said post and connected to said beam.

9. A scale including a rockingly mounted beam, a base, a flexion strip, one end of which is connected to said base, the opposite end thereof being connected to said beam and means movable longitudinally of said strip for varying the effective tension of the same.

10. A scale including a rockingly mounted beam, a base, a flexion strip, one end of which is movably connected with said beam and means for varying the effective tension of said strip and coupling the other end of the same with said base.

11. A scale including a rockingly mounted beam, a base, a flexion strip, means for movably connecting said strip to said beam, means for connecting the opposite end of said strip to said base and means associated with said connecting means and movable longitudinally of the strip for varying the effective tension thereof.

12. A scale including a rockingly mounted beam, a base for supporting the same, a horizontally extending flexion strip having one of its ends movably connected to said beam, means for securing the opposite end thereof to said base and means associated with said securing means to vary the effective tension of said strip.

13. A scale including a rockingly mounted beam, a strip to be flexed laterally of itself, members contacting with opposite faces of the strip and means associated with said strip and said members for connecting one of the same with the beam-mounting member and the other with the beam.

14. A scale including a rockingly mounted beam, a strip to be flexed laterally of itself, members contacting with opposite faces of the strip, means for securing said strip to the beam-mounting member and means for connecting said contact members to move with said beam.

15. A scale including a rockingly mounted beam, a strip to be flexed laterally of itself, members frictionally contacting with opposite faces of the strip and means associated with said strip and said members for connecting one of the same with the beam-mounting member and the other with the beam, the ends of said members having sliding contact with said strip.

16. A scale including a rockingly mounted beam, a strip to be flexed laterally of itself, members frictionally contacting with opposite faces of the strip, and means associated with said strip and said members for connecting one of the same with the beam-mounting member and the other with the beam, the ends of said members having sliding contact with said strip and being pointed to reduce friction.

17. A scale including a rockingly mounted beam, a flexion strip, means for connecting the same to the mounting member for said beam and a pair of pins connected with said beam to move therewith and engaging between them the opposite faces of said strip.

18. A scale including a rockingly mounted beam, a flexion strip, means for connecting the same to the mounting member for said beam, means for varying the resistance to flexion offered by said strip and a pair of pins connected with said beam to move therewith and engaging between them the opposite faces of said strip.

19. A scale including a rockingly mounted beam, a flexion strip, means for connecting the same to the mounting member for said beam, a pair of pins connected with said beam to move therewith and engaging between them the opposite faces of said strip and a registering mechanism, one of the elements of which is connected to move proportionately to the movement of the beam and the other being connected to the beam-mounting member.

20. A scale including a beam, a base for rockingly mounting said beam, a registering mechanism connected to said beam, and a horizontally extending spring having one of its ends connected to said base, its opposite end being connected to said beam, one of the end connections of said spring including an element having sliding contact along the spring face.

21. A scale of the even-balance type including a beam, a base for rockingly supporting said beam at a point substantially intermediate its ends, a registering mechanism connected to said beam to operate in a plane substantially in line with the point of mounting of said beam, and a horizontally extending flexion strip having one of its ends connected to said base, its opposite end being connected to said beam.

In testimony whereof I affix my signature.

GEORGE WALKER.